(12) United States Patent
Stitou et al.

(10) Patent No.: US 7,624,584 B2
(45) Date of Patent: Dec. 1, 2009

(54) INSTALLATION AND METHOD FOR PRODUCING COLD BY A REVERSIBLE SORPTION SYSTEM

(75) Inventors: Driss Stitou, St Nazaire (FR); Olivier Bertrand, Perpignan (FR); Bernard Spinner, Fabrèges (FR); Bruno Spinner, legal representative, Fabreges (FR); Caroline Spinner Brossard, legal representative, Brassac (FR); Anne Christel Spinner Kohler, legal representative, Narbonne (FR); Camille Spinner, legal representative, Perpignan (FR); Martin Spinner, legal representative, Perpignan (FR)

(73) Assignees: Centre National de la Recherche Scientifique, Paris (FR); Universite de Perpignan, Perpignan (FR)

( * ) Notice: Subject to any disclaimer, the term of this patent is extended or adjusted under 35 U.S.C. 154(b) by 677 days.

(21) Appl. No.: 10/491,196

(22) PCT Filed: Jul. 11, 2003

(86) PCT No.: PCT/FR03/02217

§ 371 (c)(1),
(2), (4) Date: Jun. 23, 2006

(87) PCT Pub. No.: WO2004/011858

PCT Pub. Date: Feb. 5, 2004

(65) Prior Publication Data

US 2007/0051118 A1 Mar. 8, 2007

(30) Foreign Application Priority Data

Jul. 24, 2002 (FR) .................................. 02 09390

(51) Int. Cl.
*F25B 15/00* (2006.01)

(52) U.S. Cl. .......................................... 62/101; 62/476
(58) Field of Classification Search ................... 62/101, 62/106, 430, 437, 476, 480, 481, 340
See application file for complete search history.

(56) References Cited

U.S. PATENT DOCUMENTS

| 4,561,259 A | * | 12/1985 | van der Sluys | ................. 62/101 |
| 5,857,345 A | * | 1/1999 | Prosdocimi et al. | ........... 62/106 |
| 6,609,561 B2 | * | 8/2003 | Sauciuc et al. | ......... 165/104.33 |

FOREIGN PATENT DOCUMENTS

| EP | 0 810 410 A1 | 12/1997 |
| FR | 2 615 601 | 11/1988 |

OTHER PUBLICATIONS

Search Report issued in International Application No. PCT/FR03/02217, Jan. 14, 2004.

* cited by examiner

*Primary Examiner*—Melvin Jones
(74) *Attorney, Agent, or Firm*—Crowell & Moring

(57) ABSTRACT

The invention relates to refrigeration at $T_U$ by a reversible sorption system.

The installation comprises a reactor (1) in which a reversible sorption between a gas G and a sorbent S takes place, a device (2) in which a reversible phenomenon involving the gas G takes place, means for bringing (2) into communication with (1), and means for isolating them, the equilibrium curve for the reversible phenomenon in (2) lying within a lower temperature range than that of the equilibrium curve for the reversible sorption in (1) in the Clausius-Clapeyron plot. The device (2) contains, apart from the gas G, a liquid/solid phase change material M having a solidification temperature $T_S$ below the frigeration working temperature $T_U$.

Use for freezing various products or for producing chilled water or ice.

15 Claims, 5 Drawing Sheets

INSTALLATION AND METHOD FOR PRODUCING COLD BY A REVERSIBLE SORPTION SYSTEM

BACKGROUND OF THE INVENTION

1. Field of the invention:

The invention relates to an installation and a method for refrigeration using a reversible sorption system, especially for freezing various products or for producing chilled water or ice.

2. Description of the Related Art

Heat generation or refrigeration installations based on a liquid/gas phase change or on reversible sorption between a gas, called the working gas, and a liquid or solid sorbent, are known. A reversible sorption may be an absorption of a gas by a liquid, an absorption of a gas on a solid, or a reaction between a gas and a solid. A reversible sorption between a sorbent S and a gas G is exothermic in the synthesis direction S+G→SG and is endothermic in the decomposition direction SG→S+G. In a liquid/gas phase change of the gas G, the condensation is exothermic and the evaporation is endothermic.

These reversible phenomena can be represented on a Clausius-Clapeyron plot by their equilibrium line:

$$\ln P = f(-1/T), \text{ more precisely } \ln P = -\frac{\Delta H}{RT} + \frac{\Delta S}{R},$$

P and T being the pressure and the temperature, respectively, $\Delta H$ and $\Delta S$ being the enthalpy and the entropy of the phenomenon (decomposition, synthesis, evaporation, condensation) involved, respectively, and R being the perfect gas constant.

The endothermic step may be advantageously employed in an installation of this type for freezing various products (especially water for obtaining ice) or for producing chilled water.

Thus, EP 0 810 410 discloses a system comprising a reactor and an evaporator/condenser connected via a pipe provided with a valve. A thermochemical reaction or a solid/gas adsorption takes place in the reactor. The latter includes means for heating the solid that it contains and means for extracting the heat from the exothermic synthesis reaction, these means being formed either by a heat exchanger, or by increasing the thermal mass of the reactor. The reactor is designed in such a way that, with its content, it has a thermal mass sufficient to absorb the heat produced during the exothermic reaction. The method of managing this system consists in bringing the evaporator/condenser into communication with the reactor when the evaporator/condenser is filled with the working gas in liquid form, this having the effect of cooling the evaporation/condenser by evaporation, and then in turning on the means intended to heat the solid so as to deliver the gas to the evaporator/condenser and to condense it therein. The means intended to heat the solid in the reactor are turned on before the previous step has been completed. The refrigeration produced by the evaporator/condenser can be used to produce chilled water or ice. However, in this system, the cycle times are relatively long because the regeneration of the system takes place at a high temperature $T_H$ and the cooling of the reactor takes place at ambient temperature $T_o$. Consequently, the reactor undergoes a relatively large thermal excursion between the regeneration temperature and the ambient temperature. This results in a low performance coefficient.

The object of the present invention is to provide a device having a very high refrigeration power per unit volume, for example around 200 kW/m$^3$, at a relatively low working temperature $T_U$ and with greatly reduced cycle times and greater performance. The term "working temperature" is understood to mean temperature of freezing products (the freezing of water, to produce ice, or the freezing of other products) or the temperature to which it is desired to lower the products, and to maintain them at this temperature, without freezing them (for example in order to obtain chilled water).

SUMMARY OF THE INVENTION

An installation according to the present invention for refrigeration at the temperature $T_U$ comprises a reactor (1) in which a reversible sorption $P_{HT}$ involving a gas G and a sorbent S takes place, a device (2) in which a reversible phenomenon $P_{LT}$ involving the gas G takes place, means for bringing the device (2) into communication with the reactor (1), and means for isolating the reactor (1) from the device (2), the equilibrium curve for the reversible phenomenon in (2) lying within a lower temperature range than that of the equilibrium curve for the reversible sorption in (1) in the Clausius-Clapeyron plot.

DETAILED DESCRIPTION OF THE PREFERRED EMBODIMENTS

Figure 1:
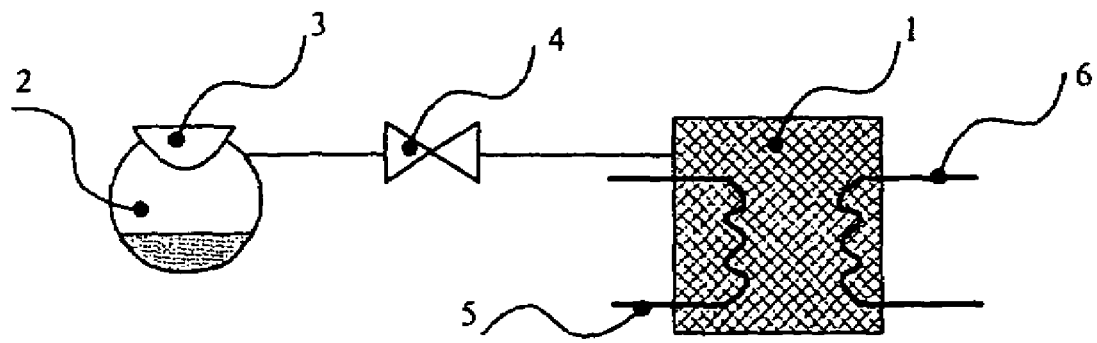
FIG. 1 shows a diagram of an installation in accordance with the present invention.

The installation is distinguished by the fact that the device (2) contains, apart from the gas G, a liquid/solid phase change material M having a solidification temperature $T_S$ below the refrigeration working temperature $T_U$. The temperature difference between $T_S$ and $T_U$ need only be of the order of a few degrees, for example of the order of 1° C. to 10° C.

The phase change material may be chosen, for example, from paraffins, such as n-alkanes having from 10 to 20 carbon atoms, eutectic mixtures and eutectic solutions.

The reversible sorption in the reactor (1) may be chosen from reversible chemical reactions between the gas G and a solid, adsorptions of the gas G on a solid, and absorptions of the gas G by a liquid.

The reversible phenomenon in the device (2) may be chosen from reversible chemical reactions between the gas G and a solid, adsorptions of the gas G on a solid, absorptions of the gas G by a liquid, and liquid/gas phase changes of the gas G. Liquid/gas phase changes are preferred as they allow refrigeration at a higher rate than with sorptions owing to the lower thermal inertia of the system.

As examples of gas G, mention may be made of ammonia (NH$_3$) and its derivatives, hydrogen (H$_2$), carbon dioxide (CO$_2$), water (H$_2$O), hydrogen sulfide (H$_2$S), methane and other natural gases. As sorption reactions, mention may be made of reactions using ammonium compounds (for example chlorides, bromides, iodides or sulfates), hydrates, carbonates or hydrides.

The exothermic synthesis step in the reactor (1), which is concomitant with the dissociation step resulting in refrigeration in the device (2), is favored if the contents of the reactor (1) are maintained at a temperature below its equilibrium temperature at the pressure prevailing in the reactor (1). It is therefore preferable to neutralize the action of the heat produced as the synthesis takes place in the reactor (1) so as to maintain the greatest possible difference between the actual temperature of the reactor (1) and its equilibrium temperature. This heat produced is firstly absorbed by the reactor and its contents. When the thermal mass of the reactor and of its contents is insufficient to absorb all of the heat generated, it is preferable to provide the reactor (1) with means for extracting the heat to the outside.

In an installation according to the invention, refrigeration takes place in the device (2). If the refrigeration is intended to produce ice or chilled water, the device (2) is in direct thermal contact with a reservoir (3) containing water. If it is desired to produce pieces of ice, it is preferred to use a reservoir (3) divided into compartments having the size of the desired pieces of ice. When the installation is used to manufacture chilled water, the reservoir (3) may be a coil, incorporated into the wall of the device (2), through which coil water flows. If the installation is intended to freeze products of various kinds, the reservoir (3) has a suitable shape for containing and freezing the products.

The liquid/solid phase change material is chosen in such a way that it has a solidification temperature $T_S$ a few degrees below the working temperature $T_U$, i.e. the temperature of the product to be frozen or cooled, for example below 0° C. when the desired object is to manufacture ice, or below the temperature of the chilled water that it is desired to obtain.

The subject of the invention is also a method of refrigeration by means of a thermochemical system comprising at least two reversible phenomena using a gas G, in which frigeration is produced during the dissociation step of the reversible phenomenon $P_{LT}$, the equilibrium curve of which in the Clausius-Clapeyron plot lies in the low-temperature range, and the system is regenerated during the dissociation step of the reversible phenomenon $P_{HT}$, the equilibrium curve of which in the Clausius-Clapeyron plot lies in the high-temperature range. The method is distinguished by the fact that the refrigeration step is prolonged beyond the end of the dissociation step of the phenomenon $P_{LT}$ by the melting of a solid/liquid phase change material in thermal contact with the gas G in the reactor in which the phenomenon $P_{LT}$ takes place.

The presence of this phase change material has two effects. Firstly, it reduces the regeneration temperature by lowering the pressure of the system (which means that regeneration is less expensive) and, secondly, it reduces the cycle time since the system continues to refrigerate thanks to the melting of the phase change material after the system regeneration step has begun.

In one particular embodiment, the refrigeration method according to the invention is implemented by means of an installation as described above. This method comprises the following steps:

a) the installation is placed in an initial state in which the reactor (1) and the device (2) are isolated from each other, (2) contains the gas in the liquid state and the material M in the liquid state, (1) contains the sorbent S in the gas-lean state, the contents of (1) and the contents of (2) are at ambient temperature $T_0$, and the reservoir (3) contains the products to be frozen or chilled;

b) the reactor (1) and the device (2) are brought into communication for the endothermic liberation of the gas G in (2) and the exothermic sorption of the gas G on the sorbent S in (1), with refrigeration in the device (2) and in the reservoir (3), solidification of the phase change material M with accumulation of latent heat, absorption of heat by the reactor (1) and its contents, and optionally extraction of the heat produced in (1);

c) at the end of step b), the reactor (1) is isolated from the device (2) in order to extend refrigeration in (2) by the melting of the material M, which releases the refrigeration stored in the form of latent heat, and thermal energy is supplied to the reactor (1) in order to carry out the endothermic dissociation of the gas-rich sorbent in (1);

d) the reactor (1) and the device (2) are brought into communication and (1) continues to be heated until total dissociation of sorbent in (1) in order to cause sudden exothermic condensation of the gas in (2) and to stop production of chilled water or to cause the ice to separate, and then the possible continuation of the melting of the material M; and e) the reactor (1) is isolated from the device (2) and the installation is left to return to the ambient temperature, i.e. to its initial state.

It is therefore apparent that, starting from a given initial state, the only actions to be undertaken to make the installation operate are that of bringing (1) into communication with (2), that of extracting the heat produced by the exothermic synthesis in (1) when the thermal mass of (1) is insufficient to entirely absorb it, and that of applying thermal energy to (1) for regeneration. The presence of the phase change material M in the device (2) extends the refrigeration step and reduces the pressure in the system during the regeneration step, and thereby decreases the regeneration temperature in the reactor (1). The amount of heat to be supplied in order to regenerate the system is therefore lower because of this small thermal excursion.

The various steps of the method are initiated by means falling within the competence of a person skilled in the art, such as delays, for example by means of a clock or a timer. The duration of the various steps depends on the desired objective [the desired amount of ice per unit time, the desired flow rate of chilled water, the geometry of the installation, the nature of the various compounds (gas and sorbent) used in the reactors (1) and (2)].

The implementation of the method of the invention in an installation according to the invention will be described in greater detail below with reference to FIGS. 1 to 8. The curves on the plots correspond to monovariant phenomena. The operation of the installation would, however, be identical if a divariant phenomenon, for example corresponding to the adsorption of the gas G achieved by an absorbent solution (for example water/NH$_3$, water/LiBr) or to the adsorption of the gas G on the surface of an active solid (for example active carbon or a zeolite), were to be used in the reactor (1).

FIG. 1 shows a diagram of an installation according to the invention.

In this figure, the installation comprises a reactor (1), in which the reversible sorption between a sorbent S and a gas G takes place, a device (2), in which a reversible phenomenon involving the gas G takes place, the equilibrium curve of which in the Clausius-Clapeyron plot lies to the left of the equilibrium line for the reversible sorption in (1), and a pipe that connects (1) to (2) and that is provided with a valve (4). The device (2) is advantageously an evaporator/condenser (referred to hereafter as an evaporator). The evaporator (2) is in direct thermal contact with a reservoir (3) incorporated into the wall of the evaporator and containing the product to be frozen or chilled, for example water to produce ice. The reactor (1) is provided with heating means (5) and with heat extraction means (6).

FIGS. 2 to 8 show the position of the installation in the Clausius-Clapeyron plot at the various steps of the refrigeration cycle. In all the figures, ln(P) plotted on the y-axis denotes the logarithm of the pressure P, and T plotted on the x-axis denotes the temperature. $P_{EV}$ denotes the pressure in the evaporator, $P_{RE}$ denotes the pressure in the reactor, $T_{AM}$ denotes the ambient temperature, $T_{EV}$ and $T_{RE}$ denote the temperature at a given instant in the evaporator and in the reactor respectively, $T_{EQ}$ denotes the equilibrium temperature in the reactor for a given pressure, $T_{REG}$ denotes the regeneration temperature in the reactor (1), VO means that the valve (4) is open and VC means that the valve (4) is closed.

A complete refrigeration and regeneration cycle of the installation will be described below for an installation in which a reversible sorption between a solid S and a gas G takes place in the reactor (1). In the device (2), the gas G is alternately evaporated or condensed.

Figure 2:
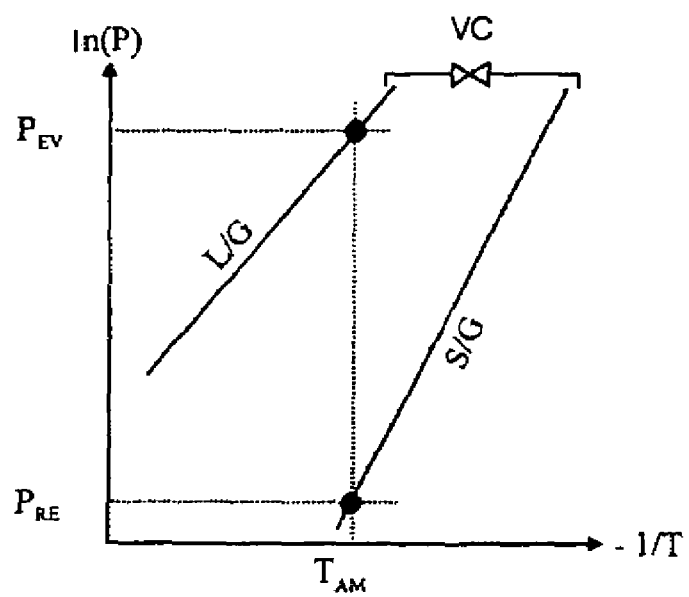
FIGS. 2-8 graphically depict the installation by means of a Clausius-Clapeyron plot at the various stages of the refrigeration cycle.

During an initial step, the installation is placed in an initial state: the evaporator and the reactor are at the ambient temperature $T_{AM}$ and at their respective equilibrium pressure at this temperature, $P_{EV}$ and $P_{RE}$, $P_{EV}$ being greater than $P_{RE}$. The evaporator (2) contains the gas G in the liquid state. The reactor (1) contains the sorbent S in the gas-lean state. The valve (4) is closed. The reservoir (3) contains water in the liquid state. The Clausius-Clapeyron plot corresponding to this effect is shown in FIG. 2.

Figure 3:
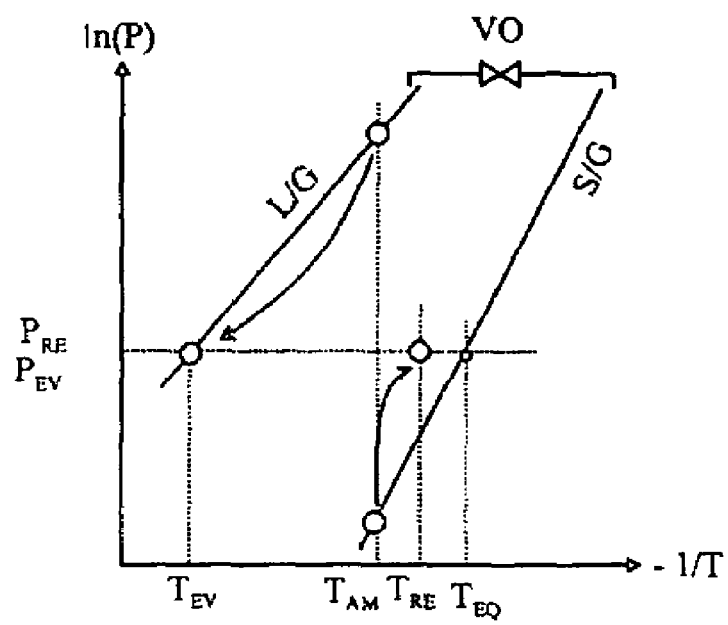

At the start of step 2, the reactor (1) is brought into communication with the evaporator (2) by opening the valve (4). Evaporation of the gas G in (2) causes a sudden drop in the temperature $T_{EV}$ in (2) with cooling of the water, possibly down to the point where the water freezes to form ice in the reservoir (3), and then solidification of material M, the solidification temperature of which is below the ice formation temperature. The gas G liberated by the evaporation in (2) is absorbed by the sorbent contained in (1) during the exothermic synthesis, which causes the temperature of the reactor to rise to $T_{RE}$ owing to the exothermic nature of this absorption. The energy produced is absorbed firstly by the thermal mass of the reactor, which has the effect of increasing the temperature of the reactive medium which, consequently, approaches its thermodynamic equilibrium $T_{EQ}$, causing a reduction in refrigeration. The temperature difference $(T_{EQ}-T_{AM})$ experienced initially by the reactor thus makes it possible to achieve a high instantaneous refrigeration power. The Clausius-Clapeyron plot corresponding to this step is shown in FIG. 3.

Figure 4:
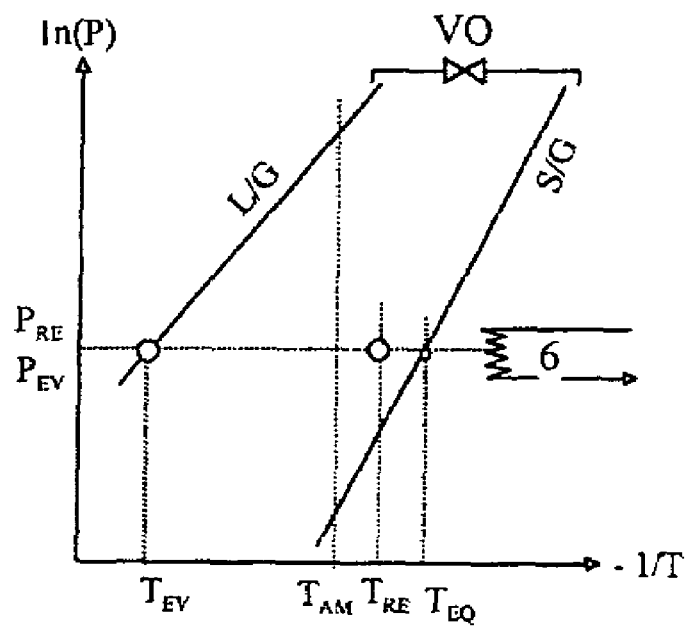

At the start of step 3, the valve (4) remains open and the means (6) for extracting the heat produced in the reactor (1) that cannot be absorbed by the thermal mass of said reactor are activated so as to maintain the sorbent S under the synthesis conditions $(T_{RE}<T_{EQ})$ when the thermal mass of the reactor proves to be insufficient to absorb all of the heat of the reaction. This step is unnecessary if the thermal mass of the reactor is sufficient to absorb all of the heat of the absorption reaction. This step thus constitutes refrigeration maintenance step. The Clausius-Clapeyron plot corresponding to this step is shown in FIG. 4.

Figure 5:
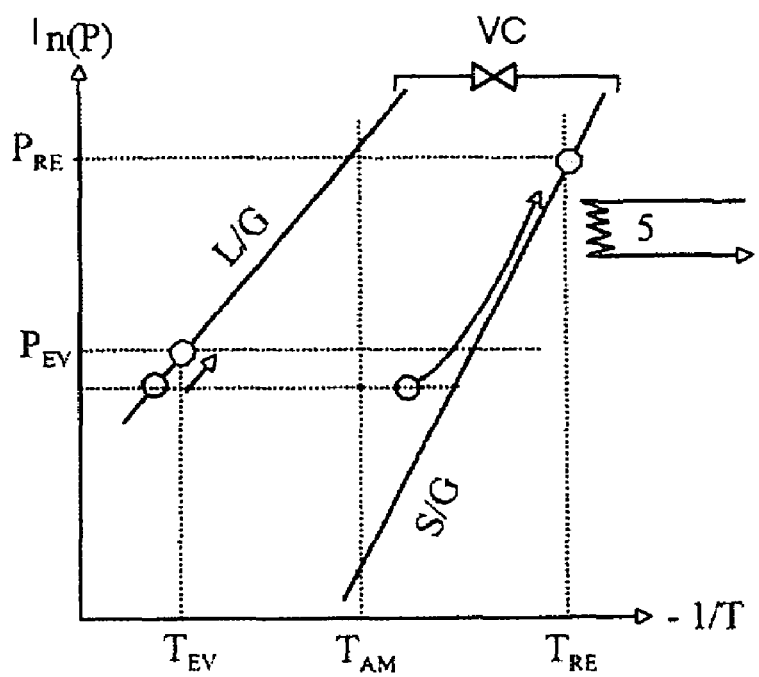

At the start of step 4, the valve (4) is closed in order to isolate the reactor (1) from the evaporator (2). The reactor (1) thus isolated is then heated by the heating means (5) and then moves onto its thermodynamic equilibrium line. This heating allows the reactor to move along its thermodynamic equilibrium line, simultaneously causing the reactor to rise in temperature and in pressure. In the evaporator, the evaporation of the gas G is stopped because the valve has been closed. However, refrigeration is provided by the phase change material, which in turn absorbs the heat. The melting of this phase change material thus makes it possible for the production of ice to continue and for the evaporator to be maintained at low temperature and, simultaneously, allows the reactor to be under the regeneration conditions. A considerable time saving results from these simultaneous phenomena. Step 4 is thus a transient step of heating the reactor and of continuing the refrigeration by melting the phase change material. The Clausius-Clapeyron plot corresponding to this step is shown in FIG. 5.

Figure 6:
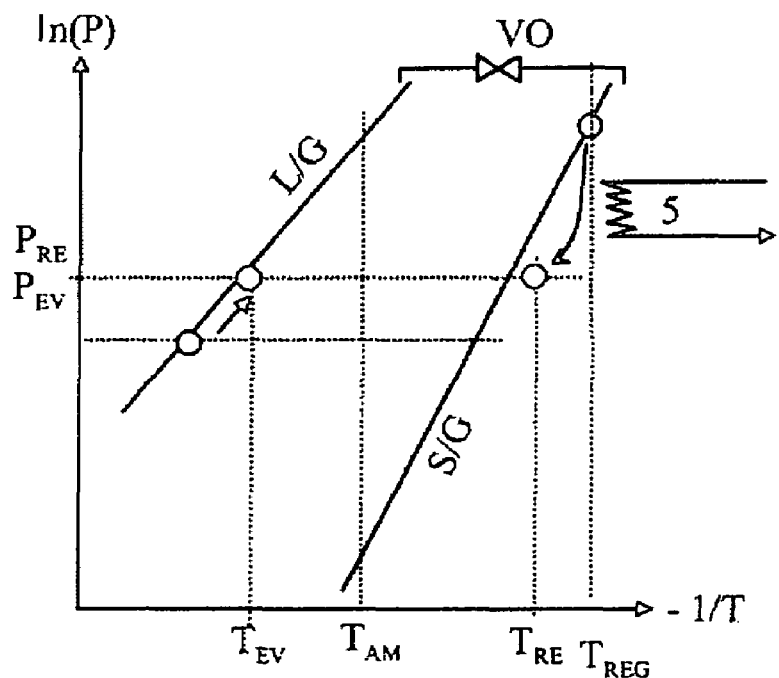

At the start of step 5, the reactor (1) is brought into communication with the evaporator (2) by opening the valve (4) and the reactor (1) continues to be heated by the heating means (5). By bringing the reactor placed under the high-pressure regeneration conditions into communication with the evaporator maintained at low pressure by the phase change material, it is possible for the reactor to be rapidly desorbed of the gas. The evaporator, receiving hot gases coming from the reactor, then acts as a condenser. Since the installation here is intended for the production of ice, it is recommended to adapt the entry position of these hot gases, for example by a tube pierced along its upper generatrix (not shown) so that these gases firstly strike the internal wall of the ice tray intimately bonded to the evaporator. The wall temperature of the tray rises, which has the effect of causing the pieces of ice to separate from the tray. These are then removed by a mechanical system (not shown). The temperature difference $(T_{REG}-T_{EQ})$ initially experienced in the reactor owing to the pressure difference allows rapid desorption of the reactive gas, thus accelerating the regeneration step. The condenser remains at a low temperature, below the ambient temperature, until the phase change material has completely melted. This step is a rapid reactor regeneration and ice separation step. The Clausius-Clapeyron plot corresponding to this step is shown in FIG. 6.

Figure 7:
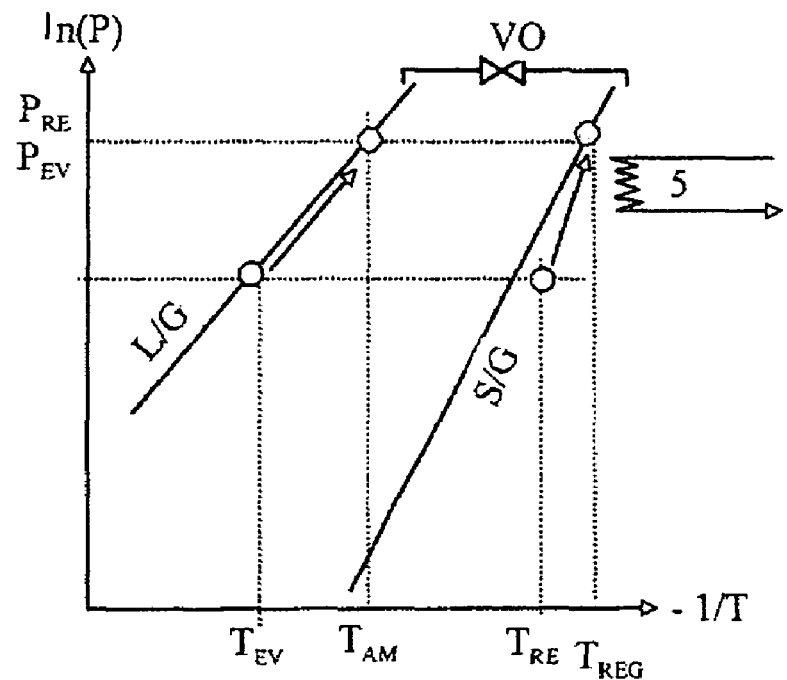

Step 6 starts when the phase change material has completely melted. The pressure in (2) increases, this having the effect of reducing the difference between the temperature of the reactor and the temperature for thermodynamic equilibrium of the reaction and therefore of reducing the amount of gas desorbed. By heating the reactor (1) by the means (5), it is then possible for the dissociation reaction to continue. The Clausius-Clapeyron plot corresponding to this state is shown in FIG. 7.

Figure 8:
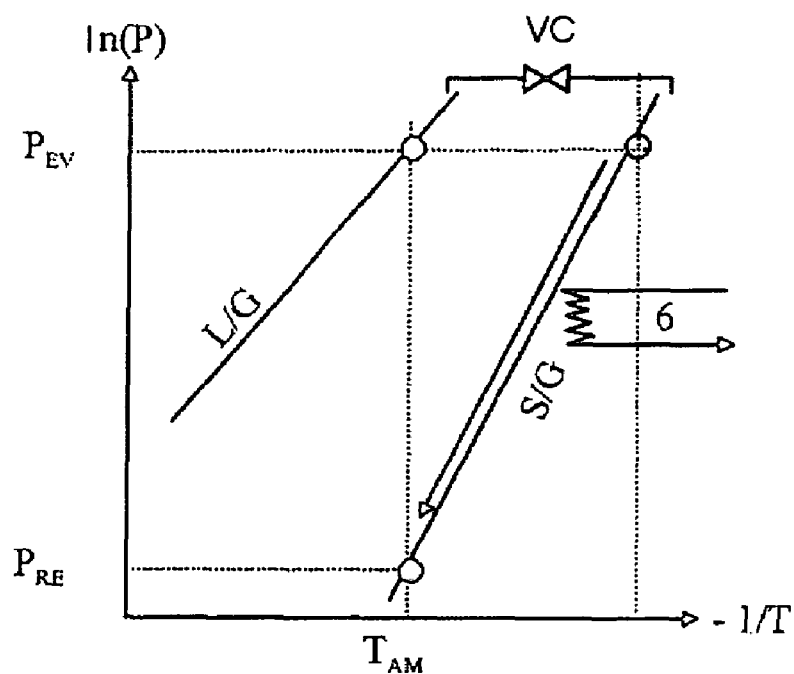

Step 7 starts as soon as regeneration is complete. The valve (4) is closed and the isolated reactor (1) is cooled if it is desired to start a new production cycle immediately, otherwise the reactor (1) is left to cool down by itself if the cycle time is unimportant. This lowers the temperature and the pressure. The device is thus placed under the initial conditions of the refrigeration production storage step of the start of the operating cycle. The Clausius-Clapeyron plot corresponding to this step is shown in FIG. 8.

Figure 9:
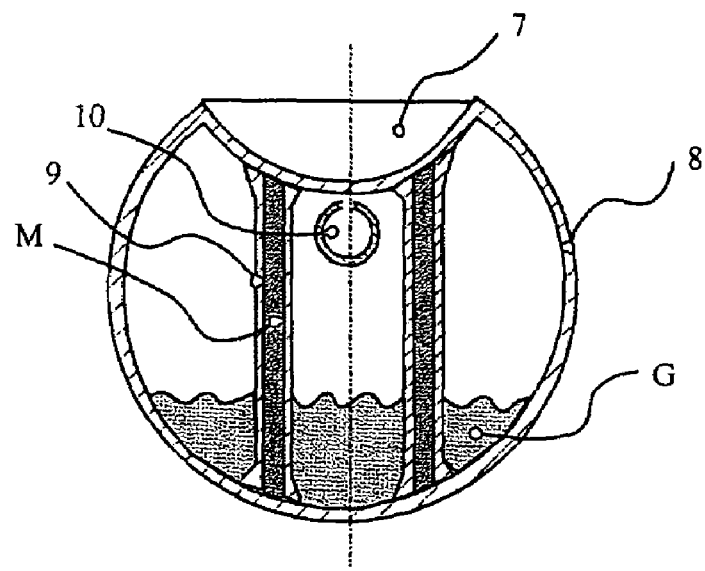
FIG. 9 shows a cross-sectional view of an evaporator.
Figure 10:
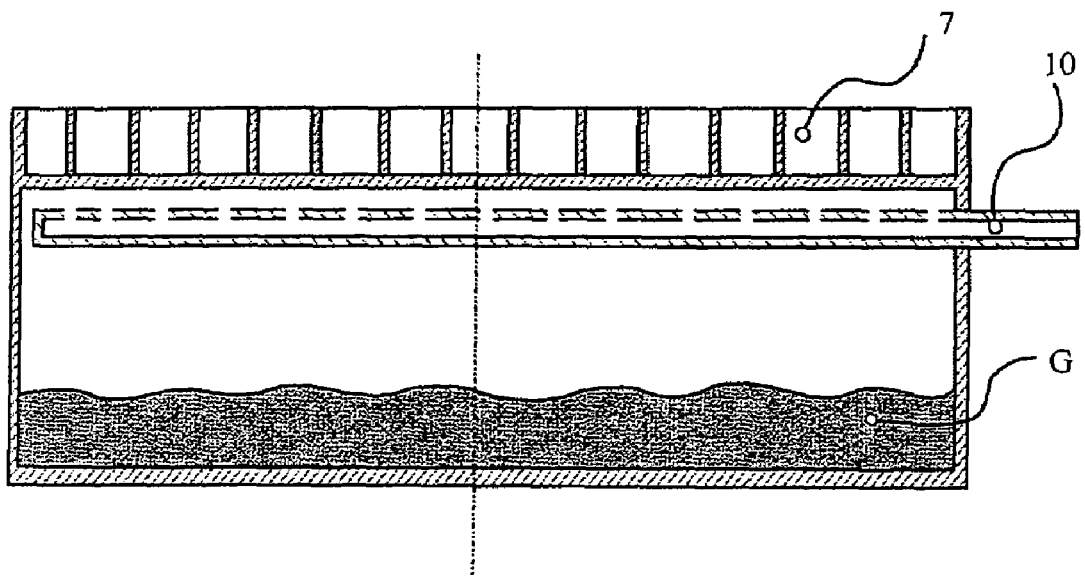
FIG. 10 shows a longitudinal sectional view of an evaporator.

The installation and the method according to the invention are particularly advantageous when the device (2) is an evaporator/condenser (hereafter referred to as an evaporator). In one particular embodiment, the evaporator has a structure as shown in FIGS. 9 and 10. FIG. 9 shows a cross-sectional view and FIG. 10 shows a longitudinal sectional view.

According to FIGS. 9 and 10, the evaporator consists of a cylinder (8) which is closed at its two ends and includes, in its upper part, a longitudinal groove whose cross section is in the form of a concave circular arc. Said groove forms the ice tray (7) that may contain several pieces of ice. Hollow fins (9) are placed inside the evaporator, in the longitudinal direction. A tube (10) connected to the pipe for transferring the gas G between the evaporator and the reactor (2) runs into the cylindrical chamber of the evaporator via a bore made in one of the ends of the cylinder, and it is placed directly beneath the wall of the ice tray (7). The working gas G, in the form of a boiling liquid, is placed in the bottom of the evaporator. The space between the walls of the fins is occupied by the phase change material M.

The outer wall of the evaporator (8) is made of a material having a high thermal diffusivity, that is to say a low thermal capacity in order to allow the wall temperature to drop rapidly and a high thermal conductivity in order to allow rapid ice formation. A material, for example based on aluminum, which has a low thermal capacity and high conductivity, is suitable because of its compatibility with ammonia, which is a gas frequently used in negative-temperature refrigeration installations. Fins 5 are places on the inside of the evaporator in order to increase the diffusion of heat from the boiling liquid 2 into the ice tray and also to increase the mechanical strength of the evaporator. The ice tray is provided with many transverse partitions placed so as to obtain the desired shape of the pieces of ice. The overall shape of the ice tray possesses a suitable semitoroidal shape, thereby allowing easy demolding of the pieces of ice formed.

The phase change material M placed between the walls of the hollow fins maintains the temperature of the evaporator at a value allowing the ice production step to be continued during the transient heating step for regenerating the reactor isolated from the evaporator.

The particular configuration of the tube (10) and its position in the chamber of the evaporator are such that the hot gases, coming from the reactor during step 5 of bringing the high-pressure reactor into communication with the evaporator maintained at low pressure by the phase change material, firstly strike the wall of the ice tray, which makes it easier to separate the pieces of ice.

The invention claimed is:

1. An installation for refrigeration at a refrigeration working temperature $T_U$, which comprises a reactor in which a reversible sorption $P_{HT}$ involving a gas G and a sorbent S takes place, a device in which a reversible phenomenon $P_{LT}$ involving the gas G takes place, means for bringing the device into communication with the reactor, and means for isolating the reactor from the device, an equilibrium curve for the reversible phenomenon in the device lying within a lower temperature range than that of an equilibrium curve for the reversible sorption in the reactor in a Clausius-Clapeyron plot, wherein the device contains, apart from the gas G, a liquid/solid phase change material M having a solidification temperature $T_S$ below the refrigeration working temperature $T_U$.

2. The installation as claimed in claim 1, wherein the reversible sorption in the reactor is selected from the group consisting of reversible chemical reactions between the gas G and a solid, adsorptions of the gas G on a solid, and absorptions of the gas G by a liquid.

3. The installation as claimed in claim 1, wherein the reversible phenomenon in the device is selected from the group consisting of reversible chemical reactions between the gas G and a solid, adsorptions of the gas G on a solid, absorptions of the gas G by a liquid, and liquid/gas phase changes of the gas G.

4. The installation as claimed in claim 3, wherein the reversible phenomenon is a liquid/gas phase change.

5. The installation as claimed in claim 1, wherein the reactor has a thermal mass sufficient to absorb heat produced during an exothermic sorption step which is carried out therein.

6. The installation as claimed in claim 1, wherein the reactor is provided with means for extracting heat to the outside.

7. The installation as claimed in claim 1, wherein the device is in direct thermal contact with a reservoir containing water.

8. The installation as claimed in claim 1, wherein the phase change material is selected from the group consisting of paraffins, eutectic mixtures and eutectic solutions.

9. The installation as claimed in claim 1, wherein the temperature difference between $T_S$ and $T_U$ is from 1° C. to 10° C.

10. The installation as claimed in claim 1, wherein the liquid/solid phase change material has a solidification temperature $T_S$ below 0° C.

11. The installation as claimed claim 1, wherein the device is an evaporator/condenser comprising:
   a cylinder which is closed at its two ends, the cylinder comprising a longitudinal groove in its upper part, the longitudinal groove having a cross section in the form of a concave circular arc and the longitudinal groove forming an ice tray;
   hollow fins defined by walls placed inside the evaporator/condenser, in the longitudinal direction;
   a tube connected to a pipe for transferring the gas G between the evaporator/condenser and the reactor extending into the cylinder of the evaporator/condenser via a bore made in one of the ends of the cylinder, the tube being placed directly beneath the ice tray;
   the gas G, in the form of a boiling liquid, placed in the bottom of the evaporator/condenser; and
   the liquid/solid phase change material M placed in the hollow fins.

12. A method of refrigeration at a working temperature $T_U$, comprising:
   utilizing a thermochemical system comprising at least two reversible phenomena using a gas G;
   a refrigeration step comprising a first dissociation step of a reversible phenomenon $P_{LT}$, the reversible phenomenon $P_{LT}$ having an equilibrium curve in a Clausius-Clapeyron plot lying in a low-temperature range; and
   a regeneration step comprising a second dissociation step of a reversible phenomenon $P_{HT}$, the reversible phenomenon $P_{HT}$ having an equilibrium curve in the Clausius-Clapeyron plot lying in a high-temperature range,
   wherein the refrigeration step is prolonged beyond the end of the first dissociation step of the reversible phenomenon $P_{LT}$ by the melting of a solid/liquid phase change material M in thermal contact with the gas G in a device in which the reversible phenomenon $P_{LT}$ takes place, said phase change material having a phase change temperature below the working temperature $T_U$.

13. The method as claimed in claim 12, wherein the method is implemented in an installation comprising:
   a reactor in which the reversible phenomenon $P_{HT}$ takes place, the reversible phenomenon $P_{HT}$ being a reversible sorption involving the gas G and a sorbent S;
   a device in which the reversible phenomenon $P_{LT}$ takes place, the reversible phenomenon $P_{LT}$ involving the gas G;
   means for bringing the device into communication with the reactor; and
   means for isolating the reactor from the device,
wherein the equilibrium curve for the reversible phenomenon $P_{LT}$ in the device is located within a lower temperature range than that of the equilibrium curve for the reversible sorption $P_{HT}$ in the reactor in the Clausius-Clapeyron plot and further wherein the device comprises the solid/liquid phase change material M having a solidification temperature $T_S$ below the working temperature $T_U$;

and wherein the method comprises the following steps:

a) placing the installation in an initial state in which the reactor and the device are isolated from each other, the device contains the gas in a first liquid state and the material M in a second liquid state, the reactor contains the sorbent S in a gas-lean state, the contents of the reactor and the contents of the device are at ambient temperature $T_0$, and a reservoir contains water to be frozen or chilled;

b) bringing the reactor and the device into communication for an endothermic liberation of the gas G in the device and an exothermic sorption of the gas G on the sorbent S in the reactor, with refrigeration in the device and in the reservoir, solidification of the phase change material M with accumulation of latent heat, absorption of heat by the reactor and its contents, and optional extraction of the heat produced in the reactor;

c) at the end of step b), isolating the reactor from the device in order to extend refrigeration in the device by the melting of the material M, which releases refrigeration stored in the form of latent heat, and supplies thermal energy to the reactor in order to carry out endothermic dissociation of a gas-rich sorbent in the reactor;

d) bringing the reactor and the device into communication and continuing to heat the reactor until total or partial dissociation of sorbent in the reactor in order to cause sudden exothermic condensation of the gas in the device and to stop production of chilled water or to cause ice to separate, and then the possible continuation of the melting of the material M; and e) isolating the reactor from the device and leaving the installation to return to the initial state.

14. The method as claimed in claim 12, wherein the phase change temperature of the solid/liquid phase change material M is below 0° C.

15. The installation as claimed in claim 8, wherein the paraffins are n-alkanes having from 10 to 20 carbon atoms.

* * * * *